(12) United States Patent
Greenberg et al.

(10) Patent No.: US 10,421,551 B2
(45) Date of Patent: Sep. 24, 2019

(54) AIRCRAFT ANTI-ICING SYSTEM

(71) Applicant: United Technologies Corporation, Farmington, CT (US)

(72) Inventors: Michael D. Greenberg, Bloomfield, CT (US); Zhijun Zheng, Avon, CT (US); David Baszak, San Diego, CA (US); Scott W. Simpson, Easthampton, MA (US)

(73) Assignee: United Technologies Corporation, Farmington, CT (US)

( * ) Notice: Subject to any disclaimer, the term of this patent is extended or adjusted under 35 U.S.C. 154(b) by 873 days.

(21) Appl. No.: 14/958,994

(22) Filed: Dec. 4, 2015

(65) Prior Publication Data
US 2016/0167792 A1     Jun. 16, 2016

Related U.S. Application Data

(60) Provisional application No. 62/091,874, filed on Dec. 15, 2014.

(51) Int. Cl.
*B64D 15/02* (2006.01)
*B64D 15/20* (2006.01)
(Continued)

(52) U.S. Cl.
CPC ............ *B64D 15/02* (2013.01); *B64D 15/20* (2013.01); *F01D 21/003* (2013.01); *F02C 7/047* (2013.01);
(Continued)

(58) Field of Classification Search
CPC .......... F01D 11/24; F01D 25/02; F01D 25/08; F01D 21/003; F02C 6/08; F02C 7/047;
(Continued)

(56) References Cited

U.S. PATENT DOCUMENTS 3,981,446 A * 9/1976 Hunter ................. A01G 25/167
239/1
4,428,194 A * 1/1984 Stokes ...................... F02C 9/18
415/27

(Continued)

FOREIGN PATENT DOCUMENTS

FR     3003544     9/2014

OTHER PUBLICATIONS

The Extended European Search Report for EP Application No. 15199254.2, dated May 4, 2016.

*Primary Examiner* — Ninh H. Nguyen
*Assistant Examiner* — Maxime M Adjagbe
(74) *Attorney, Agent, or Firm* — Carlson, Gaskey & Olds, P.C.

(57) ABSTRACT

An anti-icing system for an aircraft structure includes a cavity that has an exterior surface subject to ice accretion and a bleed source that is configured to provide a fluid to the cavity via a duct. The system includes multiple temperature sensors, disposed at the aircraft structure, with each temperature sensor configured to detect a temperature associated with an aircraft structure location. A controller is in communication with the temperature sensors. The controller is programmed to compare outputs of the temperature sensors and to determine a temperature sensor fault condition.

19 Claims, 2 Drawing Sheets

(51) Int. Cl.
  *F01D 21/00* (2006.01)
  *F02C 7/047* (2006.01)
(52) U.S. Cl.
  CPC ...... *F05D 2260/80* (2013.01); *F05D 2270/80* (2013.01)
(58) Field of Classification Search
  CPC ........... F02C 7/08; B64D 15/04; B64D 15/02; B64D 15/20; B64D 15/22
  See application file for complete search history.

(56) References Cited

U.S. PATENT DOCUMENTS

| | | | |
|---|---|---|---|
| 4,831,819 | A | 5/1989 | Norris et al. |
| 6,098,011 | A | 8/2000 | Scott |
| 7,921,632 | B2 | 4/2011 | Jacquet-Francillon et al. |
| 7,959,109 | B2 | 6/2011 | Dasilva et al. |
| 8,448,901 | B2 | 5/2013 | Porte et al. |
| 8,843,253 | B1 | 9/2014 | Chapman |
| 2007/0084969 | A1* | 4/2007 | Ellstrom ................ B64D 15/04 244/135 R |
| 2012/0192544 | A1 | 8/2012 | Roby et al. |
| 2013/0064268 | A1 | 3/2013 | Foiret |
| 2013/0088249 | A1 | 4/2013 | Biraud et al. |
| 2013/0266419 | A1 | 10/2013 | Richardson et al. |
| 2014/0203146 | A1 | 7/2014 | Chene |
| 2015/0034767 | A1* | 2/2015 | Pirat ..................... B64D 15/04 244/134 B |

\* cited by examiner

AIRCRAFT ANTI-ICING SYSTEM

CROSS-REFERENCE TO RELATED APPLICATIONS

This application claims priority to U.S. Provisional Application No. 62.091,874, which was filed on Dec. 15, 2014 and is incorporated herein by reference.

BACKGROUND

This disclosure relates to an aircraft anti-icing system used to de-ice an engine fan nacelle inlet, for example.

A gas turbine engine typically includes a fan section, a compressor section, a combustor section and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

In one type of aircraft de-icing system, bleed air from the compressor section is provided to an aircraft structure susceptible to ice accretion, for example, aircraft wings or an engine fan nacelle inlet. The flow of hot fluid from the compressor section is regulating using a valve. Typically, actuation of the valve is controlled in response to a pressure sensor reading downstream from the valve. Improved robustness over such a system is desired.

SUMMARY

In one exemplary embodiment, an anti-icing system for an aircraft structure that includes a cavity that has an exterior surface subject to ice accretion and a bleed source that is configured to provide a fluid to the cavity via a duct. The system includes multiple temperature sensors, disposed at the aircraft structure, with each temperature sensor configured to detect a temperature associated with an aircraft structure location. A controller is in communication with the temperature sensors. The controller is programmed to compare outputs of the temperature sensors and determine a temperature sensor fault condition.

In a further embodiment of the above, the aircraft structure is a fan nacelle D-duct. The bleed source is a compressor section.

In a further embodiment of any of the above, the temperature sensors are inlet temperature sensors arranged within the D-duct.

In a further embodiment of any of the above, there are at least three inlet temperature sensors.

In a further embodiment of any of the above, the duct is arranged in the fan nacelle. A duct temperature sensor is arranged within the fan nacelle but outside the D-duct. The duct temperature sensor is in communication with the controller. The controller is programmed to determine a burst duct condition based upon an output from the duct temperature sensor.

In a further embodiment of any of the above, first and second valves are arranged in the duct between the bleed source and the cavity. The first and second valves are in communication with the controller. The controller is programmed to regulate at least one of a flow and a pressure of the fluid to the cavity with the first and second valves.

In a further embodiment of any of the above, the controller is programmed to command one of the first and second valves to a full open position and regulate the flow of the fluid with the other of the first and second valves.

In a further embodiment of any of the above, a pressure sensor is in communication with the duct and is arranged downstream from the first and second valves. The pressure sensor is in communication with the controller. The controller is programmed to determine a flow rate of the fluid through the duct in response to an output from the pressure sensor.

In another exemplary embodiment, an anti-icing system for an aircraft structure that includes a cavity that has an exterior surface subject to ice accretion and a bleed source that is configured to provide a fluid to the cavity via a duct. The system includes first and second valves that are arranged in the duct upstream from the temperature sensor. A controller is in communication with the first and second valves. The controller is programmed to command one of the first and second valves to a full open position and regulate the flow of the fluid with the other of the first and second valves in a first condition, and command the other of the first and second valves to the full open position and regulate the flow of the fluid with the one of the first and second valves in a second condition.

In a further embodiment of any of the above, a temperature sensor is disposed at the aircraft structure. The temperature sensor is configured to detect a temperature associated with an aircraft structure location. The controller is in communication with the temperature sensor. The controller is programmed to regulate the flow of fluid in response to an output from the temperature sensor.

In a further embodiment of any of the above, there are multiple temperature sensors at the aircraft structure. Each temperature sensor is configured to detect a temperature associated with an aircraft structure location. The controller is in communication with the temperature sensors. The controller is programmed to compare outputs of the temperature sensors and determine a temperature sensor fault condition.

In a further embodiment of any of the above, the aircraft structure is a fan nacelle D-duct. The bleed source is a compressor section. The temperature sensors are inlet temperature sensors arranged within the D-duct.

In a further embodiment of any of the above, the duct is arranged in the fan nacelle. A duct temperature sensor is arranged within the fan nacelle but outside the D-duct. The duct temperature sensor is in communication with the controller. The controller is programmed to determine a burst duct condition based upon an output from the duct temperature sensor. The controller is programmed to close at least one of the first and second valves in response to the burst duct condition.

In a further embodiment of any of the above, a pressure sensor is in communication with the duct and the controller. The controller is programmed to command the first and second valves in response to an output from the pressure sensor.

In a further embodiment of any of the above, the first and second valves are at least one of a torque motor valve and a pulse width modulator solenoid.

In a further embodiment of any of the above, a bifurcation extends radially inward from the fan nacelle. The first and second valves are arranged in the bifurcation.

In a further embodiment of any of the above, the controller is programmed to determine an aircraft flight cycle. The controller is programmed to alternate between the first and second conditions in alternating aircraft flight cycles.

In a further embodiment of any of the above, the controller is programmed to determine an engine start condition. The controller is programmed to command the first and second valves to full open in the engine start condition.

In a further embodiment of any of the above, the controller is programmed to determine a compressor stall condition. The controller is programmed to command at least one of the first and second valves in the compressor stall condition to provide a desired stall margin to a compressor section.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
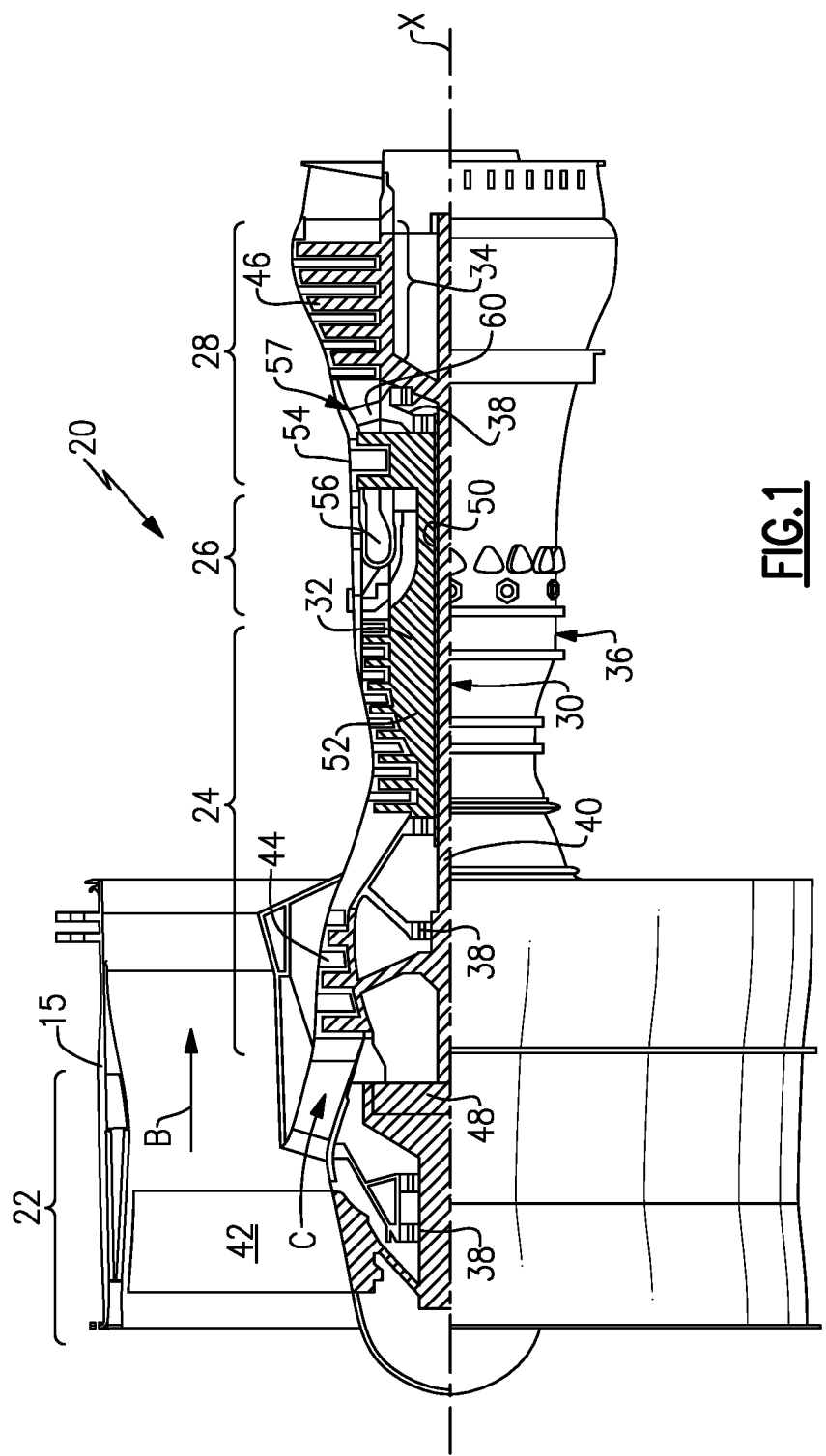
FIG. 1 schematically illustrates a gas turbine engine embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features and/or may not include a gear reduction in the fan. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis X relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis X which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7\ °\ R)]^{0.5}$. The "Low corrected fan tip speed" as disclosed herein according to one non-limiting embodiment is less than about 1150 ft/second (350.5 meters/second).

Figure 2:
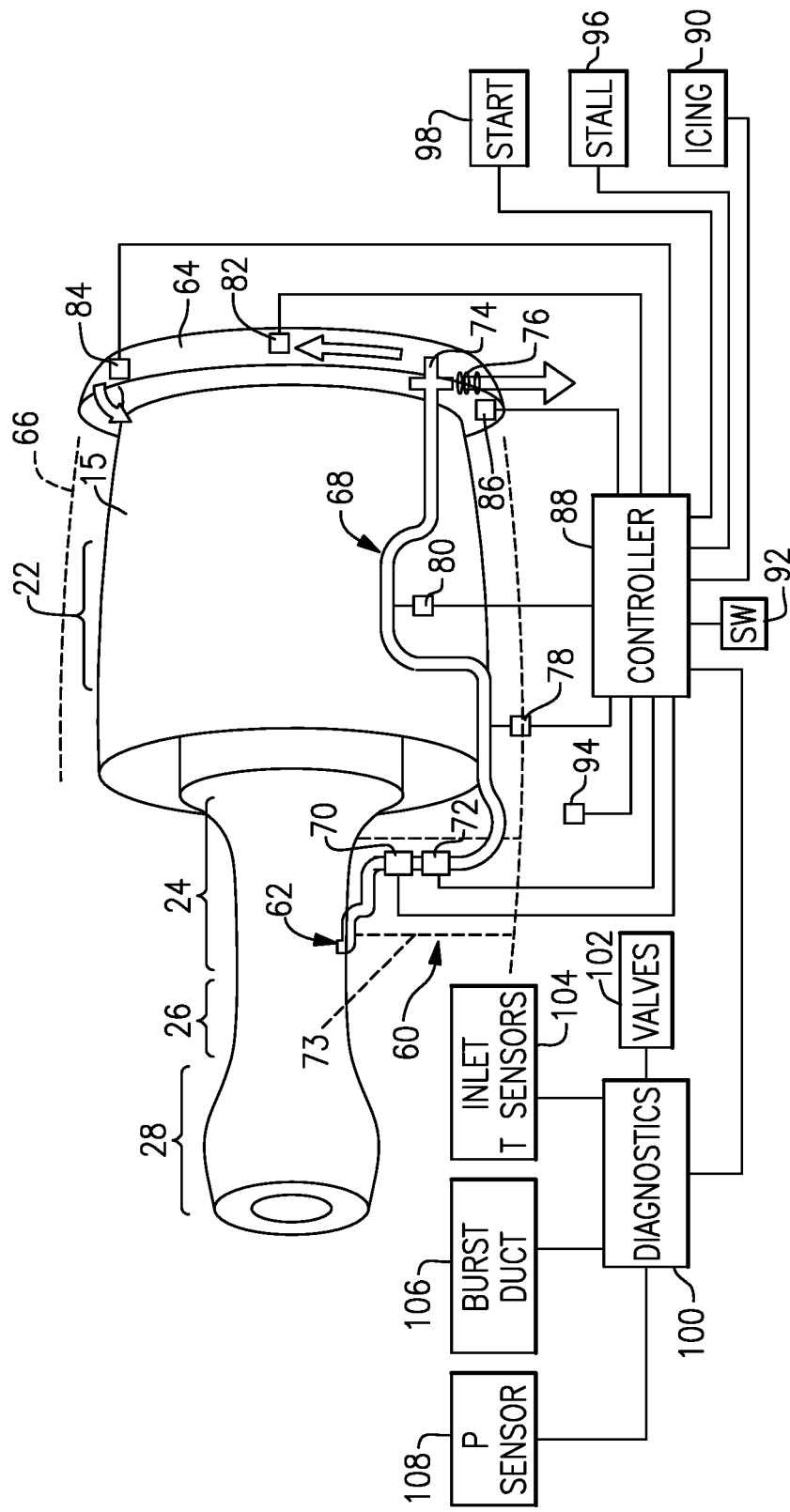
FIG. 2 is a schematic of an anti-icing system for the gas turbine engine shown in FIG. 1.

An example anti-icing system 60 is illustrated in FIG. 2. The system 60 includes a bleed source 62, such as a high pressure stage of the compressor section 24, which supplies hot air to a cavity provided by a an inlet lip circumferential duct, sometimes configured with a "D" shape cross-section subsequently referred to as a "D" duct. Though shown half round and circumferential, it could be other shapes and be non-uniform as it traverses the inlet. It may also wrap up to 100% of the inlet or a portion thereof. D-duct 64 of a fan nacelle 66. The D-duct 64 provides an inlet into the fan section 22. The inlet is subject to ice accretion during some environmental conditions during engine operation. Although the anti-icing system 60 is described with reference to a gas turbine engine fan nacelle, the system may be used to de-ice other aircraft structures, such as aircraft wings.

A duct 68 extends from the bleed source 62 through a bifurcation 73 that extends radially inward from the fan nacelle 66. The duct 68 is arranged within the fan nacelle 66 and carries fluid to a manifold and or nozzle combination 74 that distributes the hot air within the D-duct 64 to melt the ice from the exterior surface of the D-duct 64. Spent air exits the D-duct 64 through a vent 76, which may be provided by fixed or adjustable louvers.

First and second valves 70, 72 are arranged in the duct 68 between the bleed source 62 and the cavity provided by the D-duct 64. The valves are stepper servo valve (torque motors) controlled that can be fully opened or closed in approximately 3 seconds or less and moved to a locked open or other fixed position in the event of a valve failure. The first and second valves 70, 72 are in communication with a controller 88 that is programmed to regulate a flow of the de-icing fluid, for example, bleed air, to the cavity using the first and second valves 70, 72. The controller 88 may have dual channels to provide system robustness. In one example, the controller 88 is provided by a full authority digital engine control (FADEC) located within the fan nacelle 66. The controller 88 can be provided by a single unit or multiple units in communication with one another. Though torque motor controlled valves are illustrated, other electronic controls, or a combination thereof, can be used such as a pulse width modulator (PWM) solenoid. The valves may provide position feedback for back-up position control.

A pressure sensor 78 is in communication with the duct 68 and is arranged downstream from the first and second valves 70, 72. The pressure sensor 78 communicates with the controller 88, which is programmed to determine a flow rate of the fluid through the duct 68 in response to an output from the pressure sensor 78 and control the first and second valves 70, 72.

A duct temperature sensor 80 is arranged downstream from the first and second valves 70, 72 and within the fan nacelle 66 but outside the D-duct 64. The duct temperature sensor 80 is in communication with the controller 88. The controller 88 is programmed to determine a burst duct condition using diagnostics 100 based upon an output from the duct temperature sensor 80. A temperature above a predetermined threshold is indicative of a burst duct leaking hot bleed air into the nacelle 66. In response to a detected burst duct condition, the controller 88 includes a burst duct control mode 106 that is programmed to close at least one of the first and second valves 70, 72 to cease flow of the bleed air. Temperature reduction after system shutdown indicates the issue was resolved. If the temperature does not drop, the duct temperature sensor 80 is likely faulty and the system 60 may resume operation.

In one example embodiment, multiple temperature sensors 82, 84, 86, for example, at least three, are arranged within the D-duct 64 to measure the temperature of the bleed air at various temperature sensor locations. The temperature sensors are disposed at the aircraft structure, either directly in contact with the metal or adjacent fluid (such as air) temperature. The controller 88 is in communication with the temperature sensors 82, 84, 86. The temperature sensors are used to provide feedback to determine if the inlet is sufficiently de-iced and to determine if the valves are faulty and providing too much hot air to the D-duct 64, which could damage the fan nacelle 66.

The controller 88 includes diagnostics 100 that are programmed to compare outputs of the temperature sensors and determine a temperature sensor fault condition 104. Since the temperature sensors are spread out within the D-duct 64 at locations that are necessarily exposed to different bleed air temperatures, a normal operating temperature range or relationship for each sensor may be empirically determined. Temperature sensors closer to the duct 68 are expected to detect hotter air that more remote sensors. During a test cycle or during engine operation, the sensors referee one another in the sense that the controller 88 can determine if a temperature sensor is faulty based upon good readings from the other temperature sensors. The system 60 can continue operating with a bad temperature sensor by using the remaining inlet temperature sensors. Pressure sensor health 108 may also be determined.

During system operation, the controller 88 is programmed to command one of the first and second valves to a full open position and regulate the flow of the fluid with the other of the first and second valves in a first condition. The controller 88 command the other of the first and second valves to the full open position and regulate the flow of the fluid with the one of the first and second valves in a second condition. If one of the valves is determined to be faulty by the diagnostics 100, a valve control mode 102 can be used to lock the bad valve open and the other valve can be used to regulate the flow of bleed air through the system.

The entire system 60, or portions of the system, can be checked at engine start up to determine if the valves and sensors are functioning properly. In one example, the controller 88 is programmed to determine an aircraft flight cycle, which is one take-off and landing. The controller 88 is programmed to alternate between the first and second conditions in alternating aircraft flight cycles. In this manner the use and wear to of the first and second valves 70, 72 are more evenly distributed.

The de-icing system 60 can be actuated manually by the pilot using a switch 92. Alternatively, the system 60 is actuated automatically using an algorithm that predicts ice accretion based upon inputs from sensors 94, such as outside ambient temperature, low pressure compressor inlet air temperature, high spool speed, environmental control system status and wing anti-ice status. The system may be programmed to achieve maximum inlet temperature at take-off.

The de-icing system 60 provides other functionality during engine operation. The controller 88 is programmed to determine a compressor stall condition 96 in the compressor section 24. For example, the controller 88 programmed to command at least one of the first and second valves 70, 72, typically by opening the valves, in the compressor stall condition to provide a desired stall margin to a compressor section 24. The controller 88 is also programmed to enable an engine start condition 98. The controller 88 is programmed to command the first and second valves 70, 72 to full open in the engine start condition, which enables the compressor section 24 to rotate more rapidly making the engine easier to start.

Primary control of the system is based on closed loop control satisfying the outputs of the temperature sensors, inferring or directly measuring metal temperature. With this scheme, it is possible to limit the rate of change of metal temperature to reduce transient stress, and or preheat the inlet prior to takeoff. Additionally, this could also be used to shock the ice. Backup alternate control can be accomplished based on closing the loop on pressure sensor 78. This pressure combined with known downstream pressure losses and inferred or measured duct temperature can be used to calculate flow. The system can also be controlled to known valve positions based on position or angle transducers.

It should also be understood that although a particular component arrangement is disclosed in the illustrated embodiment, other arrangements will benefit herefrom. For example, more or fewer pressure and/or temperature sensors than disclosed may be used. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. An anti-icing system for an aircraft structure that includes a cavity having an exterior surface subject to ice accretion and a bleed source configured to provide a fluid to the cavity via a duct that delivers fluid to the aircraft structure, the system comprising:
   multiple temperature sensors disposed at the aircraft structure, each of the multiple temperature sensors configured to detect a temperature associated with an aircraft structure location;
   at least one valve arranged within the duct and configured to regulate fluid to the aircraft structure; and
   a controller in communication with the temperature sensors, the controller programmed to compare outputs of the temperature sensors and determine a temperature sensor fault condition, wherein the temperature sensor fault condition is at least one of a de-iced condition and a faulty valve condition relating to the at least one valve.

2. The system according to claim 1, wherein the aircraft structure is a fan nacelle D-duct, and the bleed source is a compressor section.

3. The system according to claim 2, wherein the temperature sensors are inlet temperature sensors arranged within the D-duct.

4. The system according to claim 3, comprising at least three inlet temperature sensors.

5. The system according to claim 2, wherein the duct is arranged in the fan nacelle, and a duct temperature sensor is arranged within the fan nacelle but outside the D-duct, the duct temperature sensor in communication with the controller, the controller programmed to determine a burst duct condition based upon an output from the duct temperature sensor.

6. The system according to claim 1, comprising first and second valves arranged in the duct between the bleed source and the cavity, the first and second valves in communication with the controller, the controller programmed to regulate at least one of a flow and a pressure of the fluid to the cavity with the first and second valves.

7. The system according to claim 6, wherein the controller is programmed to command one of the first and second valves to a full open position and regulate the flow of the fluid with the other of the first and second valves.

8. The system according to claim 6, comprising a pressure sensor in communication with the duct and arranged downstream from the first and second valves, the pressure sensor in communication with the controller, the controller programmed to determine a flow rate of the fluid through the duct in response to an output from the pressure sensor.

9. An anti-icing system for an aircraft structure that includes a cavity having an exterior surface subject to ice accretion and a bleed source configured to provide a fluid to the cavity via a duct that delivers fluid to the aircraft structure, the system comprising:
   a temperature sensor disposed at the aircraft structure, the temperature sensor configured to detect a temperature associated with an aircraft structure location;
   first and second valves arranged in the duct upstream from the temperature sensor; and
   a controller in communication with the first and second valves, the controller programmed to command one of the first and second valves to a full open position and regulate the flow of the fluid with the other of the first and second valves in a first condition, and command the other of the first and second valves to the full open position and regulate the flow of the fluid with the one of the first and second valves in a second condition, the controller programmed to determine a temperature sensor fault condition relating to the first and second valves.

10. The system according to claim 9, wherein the temperature sensor configured to detect a temperature associated with the aircraft structure location, the controller in communication with the temperature sensor, the controller programmed to regulate the flow of fluid in response to an output from the temperature sensor.

11. The system according to claim 10, comprising multiple temperature sensors at the aircraft structure, the multiple temperature sensors include the temperature sensor, each of the multiple temperature sensors is configured to detect a temperature associated with the aircraft structure location, the controller in communication with the temperature sensors, the controller programmed to compare outputs of the temperature sensors and determine the temperature sensor fault condition.

12. The system according to claim 11, wherein the aircraft structure is a fan nacelle D-duct, and the bleed source is a compressor section, wherein the temperature sensors are inlet temperature sensors arranged within the D-duct.

13. The system according to claim 12, wherein the duct is arranged in the fan nacelle, and a duct temperature sensor is arranged within the fan nacelle but outside the D-duct, the duct temperature sensor in communication with the controller, the controller programmed to determine a burst duct condition based upon an output from the duct temperature sensor, and the controller programmed to close at least one of the first and second valves in response to the burst duct condition.

14. The system according to claim 9, comprising a pressure sensor in communication with the duct and the controller, the controller programmed to command the first and second valves in response to an output from the pressure sensor.

15. The system according to claim 9, wherein the first and second valves include at least one of a torque motor valve and a pulse width modulator solenoid.

16. The system according to claim 12, comprising a bifurcation extending radially inward from the fan nacelle, the first and second valves arranged in the bifurcation.

17. The system according to claim 9, wherein the controller is programmed to determine an aircraft flight cycle, the controller programmed to alternate between the first and second conditions in alternating aircraft flight cycles.

18. The system according to claim 9, wherein the controller is programmed to determine an engine start condition, the controller programmed to command the first and second valves to a full open position in the engine start condition.

19. The system according to claim 9, wherein the controller is programmed to determine a compressor stall condition, the controller programmed to command at least one of the first and second valves in the compressor stall condition to provide a desired stall margin to a compressor section.

* * * * *